3,356,624
EPOXY RESIN BASED TRAFFIC PAINT
COMPOSITIONS
Dennis Neal, Convent Station, and John A. Lopez, Springfield, N.J., assignors to Shell Oil Company, New York, N.Y., a corporation of Delaware
No Drawing. Filed Dec. 28, 1964, Ser. No. 421,630
9 Claims. (Cl. 260—18)

ABSTRACT OF THE DISCLOSURE

Traffic paints possessing outstanding weathering properties are prepared by hot blending (400° F.) a solid glycidyl polyether of a polyhydric phenol having a molecular weight greater than about 700 and a liquid epoxy condensate of a polycarboxylic acid and a liquid glycidyl polyether of a polyhydric phenol, and then adding an inert organic solvent to said blend.

This invention relates to coating compositions having rapid dry and outstanding wearing properties. More particularly, the invention relates to traffic paint compositions based on a blend of an epoxy-containing condensate of a polycarboxylic acid and a glycidyl polyether of a polyhydric phenol and a polyepoxide resin.

Specifically, the invention provides traffic paints which dry rapidly and possess outstanding wearing and weathering properties comprising blends consisting of (1) a solid glycidyl polyether of a polyhydric phenol having a molecular weight of greater than about 700 and (2) a liquid epoxy-containing condensate of a polycarboxylic acid, anhydride thereof or mixtures thereof and a glycidyl polyether of a polyhydric phenol. Generally, the condensate is formed from a polycarboxylic acid and preferably an unsaturated dimer acid.

There is a growing need for improvements in traffic paints. The traffic paints presently in use are based on drying oil alkyds which suffer from what is referred to as "age-hardening." The drying oil alkyd resins contain in their molecule unsaturated fatty acid chains. These chains readily absorb oxygen from the air and dry the resin to form a tough film. The oxidation, however, continues and the film becomes progressively harder resulting in embrittlement and reduction of abrasive resistance thereof causing the film to crack and peel off. Thus, the drying oil alkyds, while initially possessing good adhesive, wearing and weathering characteristics, do not retain these characteristics due to "age-hardening," i.e., oxidation.

Accordingly, it is an object of this invention to provide traffic paints having rapid dry and which do not age-harden and are not picked up by traffic, i.e., do not stick or adhere to the tires of vehicles. As used herein, the expression "rapid dry" in relation to the traffic paint film refers to the rate at which a paint film reaches the condition of toughness and strength such that the paint film will not be damaged or picked up by traffic. This is generally effected by means of solvent evaporation only and "dry" in this case does not refer to subsequent oxidation or catalytic hardening of a paint film. Such definition of the term "dry" is common and in general use in the traffic paint industry. It is a further object of this invention to provide traffic paints which retain their toughness and abrasive resistance and which have outstanding durability.

It has now been found that these and other objects are accomplished by the paint compositions of the present invention which comprise: (1) a resin component which is a blend consisting of (a) a solid glycidyl polyether of a polyhydric phenol having a molecular weight of greater than about 700 and (b) a liquid epoxy-containing condensate of a polycarboxylic acid and a glycidyl polyether of a polyhydric phenol which acid is preferably an unsaturated dimer acid; (2) a solvent component; and (3) a pigment component.

The paint compositions of this invention are particularly suitable for traffic paint applications. They possess a toughness and durability unobtainable with other resin systems, e.g., provide excellent films after two years' use. Traffic paints heretofore were based on resins modified with drying oils to provide a hard coating. The drying oils, however, result in age-hardening, previously described. The paint compositions of the present invention dry by solvent evaporation and provide a coating of outstanding wearability and do not suffer from the inherent shortcomings of the drying-oil resin based traffic paints.

The film-forming component of the compositions of the present invention is the resin component and is conveniently described as a blend consisting of (a) a solid glycidyl polyether of a polyhydric phenol having a molecular weight of greater than about 700 to about 4000 or more and (b) a liquid epoxy-containing condensate of a polycarboxylic acid and a glycidyl polyether of a polyhydric phenol which acid is preferably an unsaturated dimer acid.

RESIN COMPONENT

The solid glycidyl polyether of a polyhydric phenol of the resin component may be represented by the Formula I

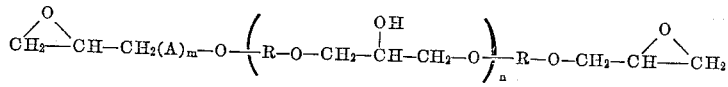

wherein A is an alkylene radical, R is a divalent hydrocarbon radical of a dihydric phenol, n represents an integer from 2 to 12 and preferably an integer from 2 to 3.7 and from 9 to 12 and m represents an integer selected from 0 to 1.

Polyethers corresponding to the above formula are prepared, in general, by heating at about 50° C. to 200° C. a dihydric phenol with a halogen-containing epoxide or dihalohydrin, such as epichlorohydrin in a basic reaction medium.

The various dihydric phenols which may be used in preparing the polyethers of Formula I include mononuclear phenols, such as resorcinol, catechol, hydroquinone, methyl resorcinol, etc.; or polynuclear phenols, like 2,2-bis(4 - hydroxyphenyl)propane(bis-phenol), 4,4′ - dihydroxybenzophenone, bis(4-hydroxyphenyl)methane, 1,1-bis(4 - hydroxyphenyl)ethane, 1,1 - bis(4 - hydroxyphenyl)isobutane, 2,2-bis(4-hydroxyphenyl)butane, 2,2-bis(4-hydroxy - 2 - methylphenyl)propane, 2,2 - bis(4 - hydroxy - 2 - tertiarybutylphenyl)propane, 2,2 - bis(2 - hydroxynaphthyl)pentane, 1,5-dihydroxynaphthalene, etc.

The halogen-containing epoxides may be further exemplified by 3-chloro-1,2-epoxybutane, 3-bromo-1,2-epoxyhexane, 3-chloro-1,2-epoxyoctane, and the like.

Depending upon the type of product desired, there is used, for example, from more than 1 to 2 or more moles of epichlorohydrin per mole of dihydric phenol. Also present is a base such as sodium hydroxide, generally in amount of about 5% to 30% stoichiometric excess of the amount of epichlorohydrin, i.e. 1.05 to 1.3 equivalents of base per mole of epichlorohydrin. In effecting the reaction, the dihydric phenol is mixed with an aqueous solution of the base and heated. The epichlorohydrin is then added rapidly to the stirred reaction mass. The initial reaction is somewhat exothermic so that a temperature rise occurs to some extent. After addition of the epichlorohydrin, heating is applied for several hours while stirring in order to complete the reaction. While still in molten state, the formed polyether is washed with water until free of base, and then heated to remove water.

The higher solid glycidyl polyethers of polyhydric phenols of constituent (a) are conveniently prepared by first preparing a lower molecular weight polyether and then reacting that polyether with additional polyhydric phenol.

*Polyether A.*—Into a reaction vessel fitted with a stirrer, 1 mol of 2,2-bis(4-hydroxyphenyl)propane, referred to as (bis-phenol), and 1.88 mols of sodium hydroxide as a 10% aqueous solution are introduced and heated to about 45° C. whereupon 1.57 mols of epichlorohydrin are added rapidly while agitating the mixture. The temperature is then adjusted so that the mixture is heated at about 100° C. to 105° C. for about 80 minutes. The mixture separates into a two-phase system and the aqueous layer is decanted. The product is then washed with hot water until neutral to litmus whereupon the resulting polyether is drained and dehydrated by heating at about 150° C.

The polyether has a softening point of about 71° C. (Durran's mercury method). The molecular weight is 900 measured ebullioscopically in ethylene dichloride so average $n=2$. The equivalent weight to esterification is 145, which value is the grams of polyether that will esterify and combine completely with one gram molecule of fatty acid. This value is obtained by heating a sample of the polyether with about twice the theoretical amount of higher fatty acid necessary to react with all of the hydroxyl and epoxy groups, the higher fatty acid being Armour's Neofat No. 3 consisting of about 50% linoleic acid, 40% oleic acid, and 10% stearic acid. The heating is effected at about 230° C. until a constant acid value is obtained. This may require 10 hours' heating. By back titrating the unreacted fatty acid with base, a measure is obtained from which the equivalent weight to esterification is calculated. The polyether also has an epoxide equivalent of from 450 to 522 which is the grams of resin containing one gram-equivalent of epoxide, an epoxy value of 0.103 equivalent per 100 grams and a hydroxyl value of 0.28 equivalent per 100 grams of resin. The 1,2-epoxy equivalency is, therefore, 1.8.

*Polyether B.*—This glycidyl polyether of higher molecular weight is prepared in a like manner to that of Polyether A except that for each mole of bis-phenol there is employed 1.22 moles of epichlorohydrin and 1.37 moles of sodium hydroxide. The resulting product has a melting point of 98° C., a molecular weight of 1400 and an epoxide equivalent of from 872 to 1025.

In like manner, other polyethers of bis-phenol or of other dihydric phenols may be prepared which will have different molecular weights and values for $n$ depending upon the molar ratio of epichlorohydrin to dihydric phenol used in preparation thereof.

*Polyethers C and D.*—The still higher molecular weight polyethers are obtainable by reacting Polyether B with an additional quantity of dihydric phenol. For example, a preferred polyether designated as Polyether C, having a softening point of about 130° C., a molecular weight of about 2900 and an equivalent weight to esterification of 190 is obtained by reacting Polyether B with an added 5% of bis-phenol. This reaction is effected by heating the polyether to 150° C., and then adding the bis-phenol. The heating is continued for about two hours while stirring the reaction mass and gradually increasing the temperature to about 190° C. Polyether D is prepared in the same manner as Polyether C except Polyether B is reacted with an added 7.75% of bis-phenol. Polyether D has a softening point of about 156° C. and an average molecular weight of about 3750. The preferred solid polyethers of constituents (a) are Polyether A, Polyether C and Polyether D.

The liquid epoxy-containing condensate of a polycarboxylic acid and a glycidyl polyether of a polyhydric phenol of the resin component is formed by reacting a polyether of Formula I wherein $n$ is a positive integer from 0 to 0.5 and R, A and $m$ are as previously defined with a polycarboxylic acid which acid is preferably an unsaturated dimer acid. The preferred molecular weights of the polyether is in the range of from about 284 to about 500, although it may be greater.

The glycidyl polyether of constituent (b) which is reacted with the polycarboxylic acid is prepared in the same manner as the polyether of constituent (a). The preferred polyether for constituent (b) is that having a molecular weight of about 350 and is prepared as follows.

*Polyether E.*—About 2 moles of 2,2-bis(4-hydroxyphenyl)propane were dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50.

The molecular weight of the polyether may be varied by varying the mole ratio of epichlorohydrin to polyhydric alcohol.

Suitable acids for use in preparing the epoxy-containing condensate of constituent (b) include polymerized unsaturated long chain acids. Examples of long chain acids that may be used for this purpose include those containing at least 10 carbon atoms, and preferably more than 14 carbon atoms; such as dodecenedoic acid; 10,12-eicosadienedioc acid; 10,12-eicosadienedioc acid; tetradecenoic acid; linoleic acid; linolenic acid; eleostearic acid, and licannic acid. The preferred acid is dimerzed octadecadienoic acid having the formula

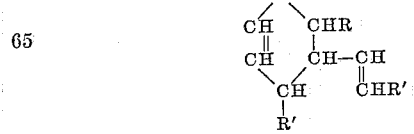

wherein R is the radical $CH_3-(CH_2)_5-$ and R' is the radical $-(CH_2)_7-CO_2H$. The dimerized acid is prepared by taking 9,11-linoleic acid (octadecadienoic acid) and converting it to the methyl ester by methylolysis using 0.25% NaOH in excess of the acid at a temperature of from 70° to 75° C. Methanol is removed by distillation. The methyl ester is heated at 300° C. for 16 hours in the presence of 0.03% anthraquinone as a catalyst to yield the polymer. Hydrolysis thereof yields the acid.

The epoxy-containing condensates of the resin component are prepared by reacting a polycarboxylic acid, polycarboxylic acid or mixture thereof with a polyether in the presence of a catalyst, such as a tertiary amine, quanternary ammonium salt or organo-substituted phosphine. The catalysts are described in U.S. Patent No. 2,970,983 to Newey.

The amount of reactants employed is critical. Unless the proper proportions are utilized, the resulting product will be an insoluble infusible product free of epoxy groups. In order to obtain the soluble epoxy-containing condensates, it is essential that the acidic component be reacted with at least 1.5 times the chemical equivalent amount of the polyepoxide. As used herein, the expression "chemical equivalent" in relation to the acidic and polyepoxide mixtures refers to the amount needed to furnish one epoxy group for every acidic group. Preferably, the acidic component and the polyepoxides are combined in chemical equivalent ratio of 1:2 to 1:4 and if the acid component is trifunctional or higher, a larger excess of polyepoxide is preferred, for example 1:6 or even higher.

If the component reacted with the polyether is an acid, the method of adding is also important. It is usually desirable to slowly add the acid to the polyepoxide over a period of time in order to prevent conversion of the product to insoluble infusible state.

The catalysts are preferably used in amounts varying from 0.05% to 3% by weight of the reactants.

The temperatures employed in the reaction will generally vary from about 50° C. to about 150° C. The reaction is preferably conducted under atmospheric pressure, but it may be advantageous in some cases to employ subatmospheric or superatmospheric pressures.

A preferred epoxy-containing condensate is that formed by reacting Polyether E with dimerized octadecadienoic acid as follows:

384 parts of Polyether E and 296 parts of dimerized octadecadienoic acid were placed in a reaction flask noted in Example I and the mixture heated. When the temperature reached 120° C., 6.8 parts of methyl diethanolamine was added. At this time, heat was turned off. A slight exotherm occurred bringing the temperature up to 142° C. Mixture held at 150° C. for a period of 2 hours. The resulting product was a viscous liquid having a high epoxy value.

The resin component may be prepared by hot blending (a) a solid glycidyl polyether of a polyhydric phenol and (b) an epoxy-containing condensate of a polycarboxylic acid and a liquid glycidyl polyether of a polyhydric phenol in a reaction vessel at a temperature of from about 300° F. to about 500° F., and preferably at temperatures of from about 375° F. to about 425° F. The temperature is maintained at the desired temperature, for example, 400° F. A clear liquid is obtained and the heating is continued at 400° F. for an additional period of time, usually about an hour. The blending is generally conducted under atmospheric conditions but may be conducted under subatmospheric or superatmospheric if desired.

The proportions of polyethers C and D and epoxy-containing condensate in the resin component may vary over a wide range, for example, the weight proportion ratio may vary from about 5:95 to about 95:5. Generally, the ratio is 1:9 to 9:1, and preferably from 15:85 to 30:70, e.g., 25:75 polyether to epoxy-containing condensate.

The proportions of Polyether A and epoxy-containing condensate in the resin component may also vary over a wide range, for example, the weight proportion ratio may vary from about 5:95 to 95:5. Generally, the ratio is 1:9 to 9:1, and preferably from 3:7 to 1:9 polyether to epoxy-containing condensate. The blending may be easily accomplished by the method herein before described for Polyether C and epoxy-containing condensate but may be more easily accomplished providing the Polyether A is no more than about 20% w. of the total resin system; i.e., the ratio of polyether to epoxy-containing condensate is 2:8 or less, by blending appropriate resin solutions of the Polyether A and epoxide-containing condensates without heating.

The blending may be accomplished by any suitable means, such as by conventional stirring means.

SOLVENT COMPONENT

A suitable solvent component of the traffic paint compositions of the present invention includes ketones such as acetone and methyl ethyl ketone, alcohols, glycol ethers, toluene, xylene, benzene, mineral spirits, naphthas and other aromatic petroleum distillates. The solvent component usually consists of a mixture of two or more of the above compounds. The ratio of solvent to resin component may be varied widely depending upon the chosen method of applying the traffic paint to the highway surface, i.e., spraying, brushing, rolling, etc. Spraying is the usual method of applying the traffic paint to the highway surface. The concentration in this instance is usually a volume ratio of about 50:50, but in some situations may vary from 70:30 to 30:70, solvent to polyepoxide ester resin.

PIGMENT COMPONENT

The third and final component of the paint compositions of the present invention is the pigment. The pigment component usually contains a mixture of pigments. Any of the standard pigments which are used in conventional traffic paints are suitable for use in the paint compositions of this invention. Such pigments include, for example: 100% titanium dioxide; 30% titanium dioxide-70% calcium sulfate mixture; a mixture of calcium carbonate and magnesium carbonate; diatomaceous silicas, treated and untreated clays, calcium sulfate, zinc oxide, mica, magnesium silicate and titanium calcium among others. The concentration of the pigment in the paint compositions; expressed as percent pigment volume concentration, varies from about 40:60 to 60:40 and preferably from 45 to 55. The term "percent pigment volume concentration" has reference to that volume portion of the paint, excluding the solvent which is pigment. e.g., a composition comprising ⅓ resin, ⅓ solvent and ⅓ pigment by volume would have a percent pigment volume concentration of 50.

In terms of the total paint composition to which curing agents may be subsequently added the concentration of the resin component may range from about 20% to 48% by volume, the concentration of the solvent components may range from about 15% to 58% by volume and the concentration of the pigment component may range from about 17% to 51% by volume, the sum of the three components totaling 100%.

The pigment is added to the solvent-resin composition known more commonly as vehicle and blended therewith to obtain a homogeneous paint composition. Any suitable means of blending may be employed. The resulting traffic paint composition is applied to the highway surface, for example by spraying. The solvent evaporates from the composition leaving a tough film on the surface which has excellent wear and weather resistances.

The traffic paint compositions of the present invention may be applied to highway surfaces by techniques presently employed in applying conventional traffic paints. The paint compositions may be employed as "one-package" systems or a curing agent may be added to the composition just prior to applying the composition to the surface. Suitable curing agents include epoxy curing agents, such as adducts of polyepoxides and amines. The concentration of the curing agents is generally from about 5 to 60 parts per hundred parts resin, and preferably 20 to 30 parts per hundred parts resin. A preferred curing agent is the adduct of (1) a polyepoxide of Formula I wherein R is

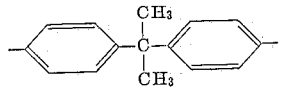

and having a molecular weight of about 380 and an epoxide equivalent of from 180–195 and (2) diethylene triamine in molar excess. Another preferred curing agent is the reaction product of 1 mole of ethylene diamine and 4 moles of ethyl isobutyl ketone having a boiling point between 80° and 84° C. (1 mm. Hg).

The following examples illustrate the preparation and use of the present paint compositions and compares the compositions with conventional alkyd resin based traffic paints.

The following example is for purposes of illustration and is in no way intended to limit the invention to the particular compositions illustrated.

Example 1

Preparation of a traffic paint composition consisting of (1) hot melt blend of (a) Polyether C and (b) epoxy-containing condensate of Polyether E and dimerized octadecadienoic acid, (2) xylene and (3) pigment:

25 parts by weight of Polyether C and 75 parts by weight of the epoxy-containing condensate of Polyether E and dimerized octadecadienoic acid are placed into a kettle and heated at a temperature of 400° F. to form a clear liquid. The heating is continued at 400° F. for an additional hour. Upon cooling to about 100° F. an amount of xylene is added thereto to obtain a solution thereof which consists of about 50% by weight of xylene. The solution is placed into a drum equipped with a stirrer. Pigment consisting of titanium dioxide, magnesium silicate, calcium carbonate, diatomaceous silica is added during constant stirring in the amount required to produce a composition having a 50% pigment volume concentration. The stirring is continued for approximately 15 minutes to obtain a loose mix or premix. The premix is then processed further to obtain complete pigment dispersion within the resin-solvent or vehicle portion of the paint. This can be readily accomplished by milling, grinding, or high shear mixing. Satisfactory dispersion is obtained by further processing the premix on a three roll mill which effects complete breakdown of the pigment agglomerates and thoroughly mixes the composition. The resulting homogeneous paint composition has a white color. The composition was tested with a curing agent, the adduct of (1) a polyepoxide of Formula I wherein R is

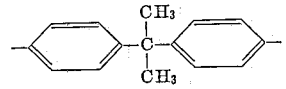

and having a molecular weight of about 380 and an epoxide equivalent of from 180–195 and (2) diethylene triamine in molar excess. For convenience, this composition is referred to hereinafter as "A."

A second composition is prepared according to the above procedure except that 15 parts by weight of Polyether C and 85 parts by weight of the epoxy-containing condensate are employed in place of the amounts specified above. This composition is hereinafter referred to as "B."

A third composition is prepared according to the above procedure except that 20 parts by weight of Polyether C is employed and 80 parts by weight of the condensate is employed. This composition is hereinafter referred to as "C."

A fourth composition is prepared by cold blending 20 parts by weight of Polyether A and 80 parts by weight of the epoxy-containing condensate of Polyether E and dimerized octadecadienoic acid, Polyether A being added as a 75% w. solution in xylene and the epoxy-containing condensate being added as a 75% w. solution in xylene. Pigment consisting of titanium dioxide, calcium carbonate, magnesium silicate and diatomaceous silica is added and dispersed in the resin solution using the same procedure for dispersing pigments described in Example 1 except that the pigments added result in a composition having a 45% pigment volume concentration. This composition is hereinafter referred to as "D."

A fifth composition is prepared according to the procedure described in the fourth composition except that the pigments added result in a composition having 50% pigment volume concentration. This composition is hereinafter referred to as "E."

Table 1 gives comparative results obtained when the traffic paint compositions "A," "B," "D" and "E," and conventional alkyd resin based paints were applied to highway surfaces. The condition of the paint on the surfaces was observed at the end of specified periods. It can be seen from the table that the paint compositions of the present invention have less "percent film loss" than the alkyd resin based paints.

Table 2 sets forth the properties of the drying-oil alkyd resin paint compositions used in Example 1.

TABLE 1.—DURABILITY—TRANSVERSE EXPOSURE TO TRAFFIC

| Coating | Percent Pigment Volume Concentration | Percent Film Loss | | |
|---|---|---|---|---|
| | | U.S. Route 1 [1] 6 mos. | U.S. Route 40 [2] | |
| | | | 6 mos. | 2 yrs. |
| Composition A | 50 | 10 | 20 | (*) |
| Composition B | 50 | 5 | 25 | (*) |
| Composition D | 45 | 5 | 15 | 50 |
| Composition E | 50 | 2 | 15 | (*) |
| Maryland Specification 1962 | 58 | 35 | 35 | 100 |
| Pennsylvania Specification 1962 | 53 | 15 | | |
| New Jersey Specification 1961, Type III | 55 | 15 | | |

* The evaluation series contained only Example D.
[1] U.S. Route 1 near Newark Airport, Newark, New Jersey.
[2] U.S. Route 40 between Baltimore and Frederick, Maryland.

TABLE 2.—ALKYD RESIN PROPERTIES

| | Maryland 1962 | | Pennsylvania 1962 | | New Jersey 1961 Type III | |
|---|---|---|---|---|---|---|
| | Min. | Max. | Min. | Max. | Min. | Max. |
| Vehicle: | | | | | | |
| Alkyd resin solution (50% NV), percent | 83.0 | 85.0 | 83.0 | 85.0 | | |
| Petroleum thinner, dries and antiskinning agent, percent | | 17.0 | | 17.0 | | |
| Alkyd resin solution (60% w.) | | | | | 80% | |
| 30 Chlorinated rubber solution (40% w.) | | | | | 20% | |

TABLE 2.—ALKYD RESIN PROPERTIES

|  | Maryland 1962 | | Pennsylvania 1962 | | New Jersey 1961 Type III | |
|---|---|---|---|---|---|---|
|  | Min. | Max. | Min. | Max. | Min. | Max. |
| Alkyd Resin: | | | | | | |
|   Solids content (by wt.), percent | 49.5 | 50.5 | 49.0 | | 60 | |
|   Solvent | V.M. and P. Naphtha | | V.M. and P. Naphtha | | Toluene | |
|   Color (Gardner) | | 8 | | 9 | | 6 |
|   Acid Number (total vehicle) | | *4 | | 7 | | |
|   Viscosity (Gardner-Holdt) | N-P | | J-N | | | |
|   Wt. per gallon at 77° F. (pounds) | 7.5 | | 7.45 | | | |
|   Aliphatic solvent tolerance | 100 to 1 | | 100 to 1 | | | |
| Alkyd Resin Solids Composition: | | | | | | |
|   Phthalic anhydride, percent | 35.0 | | 34.0 | | 30.0 | |
|   Fatty acids, percent | 48.0 | | 48.0 | 53.0 | 54.0 | |
|   Iodine number of fatty acids | 115 | 130 | 115 | 130 | 115 | 130 |
|   Rosin and derivatives | | None | | None | | None. |
|   Natural resins | | do | | do | | |
|   Other synthetic resins | | do | | do | | |
| Chlorinated Rubber Composition: | | | | | | |
|   Chlorine, percent | | | | | 66 | 69 |
|   Color Gardner (20% w. in toluene) | | | | | | 4 |
|   Viscosity (cps.) (20% w. in toluene) | | | | | 9 | 25 |
| Chlorinated Rubber Solution (by weight): | | | | | | |
|   Chlorinated rubber (10 or 20 cps. type) | | | | | 40 | |
|   Propylene oxide or Epichlorohydrin | | | | | 0.8 | |
|   Benzene | | | | | 60 | |

*Resin solution only.

Example 2

Preparation of traffic paint composition consisting of (1) hot melt blend of (a) Polyether D and (b) epoxy-containing condensate of Polyether E and dimerized octadecadienoic acid, (2) solvent and (3) pigment:

90 parts by weight of epoxy-containing condensate of Polyether D and dimerized octadecadienoic acid are placed into a kettle and heated at 400° F. to form a liquid. The liquid is then maintained at 400° F. for an additional hour. Upon cooling to about 100° F. an amount of xylene is added to the liquid to obtain a solution thereof consisting of about 50% by weight of xylene. Pigment consisting of titanium dioxide, calcium carbonate, magnesium silicate and diatomaceous silica is added and dispersed in the resin solution using the same procedure in Example 1 except that the pigments added result in a composition having a 45% pigment volume concentration.

The composition was tested on U.S. Route 1 near Newark Airport, Newark, N.J., for 190 days for percent film loss. The composition was tested with a curing agent, the reaction product of 1 mole of ethylene diamine and 4 moles of ethyl isobutyl ketone, added just prior to applying the composition to the highway and without a curing agent. The results of the tests and comparisons with the alkyd resin compositions defined in Example 1 are given in Table 3.

TABLE 3

| Composition: | Percent film loss after 190 days |
|---|---|
| Example 2 with curing agent | 15 |
| Example 2 without curing agent | 5 |
| Maryland Specification 1963 | 25 |
| Pennsylvania Specification 1963 | 20 |
| New Jersey Specification 1963 | 15 |

We claim as our invention:

1. A paint composition comprising from about 15% to 58% by volume of an inert organic solvent, from 17% to 51% by volume of a pigment and from 20% to 48% by volume of a liquid blend wherein the total of the solvent, pigment and blend is 100%, said liquid blend comprising (a) from about 5% to 95% by weight of a solid glycidyl polyether of a polyhydric phenol having the general structure:

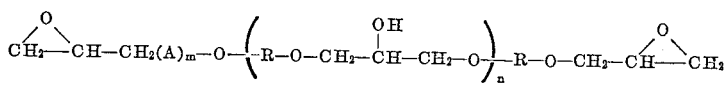

wherein A is an alkylene radical, R is a divalent hydrocarbon radical of a dihydric phenol, $n$ is an integer from 2 to 12 and $m$ is an integer selected from 0 and 1, and (b) from about 95% to 5% by weight of a liquid epoxy-containing condensate prepared by reacting a polycarboxylic acid with at least 1.5 times the chemical equivalent amount of a liquid glycidyl polyether of a polyhydric phenol having the general structure as defined in (a) wherein $n$ has an average value between about 2 and 3.7.

2. A paint composition comprising a liquid resin blend, an inert organic solvent and pigment wherein the volume ratio of resin blend to solvent varies from about 70:30 to 30:70 and the volume ratio of resin blend to pigment varies from about 40:60 to 60:40, said liquid blend comprising (a) from about 10% to 30% by weight of a solid glycidyl polyether of a polyhydric phenol having the general structure:

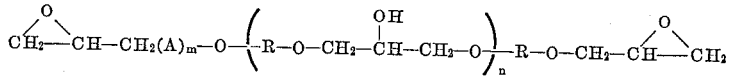

wherein A is an alkylene radical, R is a divalent hydrocarbon radical of a dihydric phenol, $n$ is an integer having a value from 2 to 12 and $m$ is an integer selected from 0 and 1, said polyether having a molecular weight from about 700 to 4,000, and $$CH_2\!\!-\!\!\overset{O}{\!\!\diagdown\!\!}\!CH\!-\!CH_2(A)_m\!-\!O\!-\!\!\left(\!R\!-\!O\!-\!CH_2\!-\!\overset{OH}{\underset{|}{C}H}\!-\!CH_2\!-\!O\!\right)_{\!\!n}\!\!\!-\!R\!-\!O\!-\!CH_2\!-\!\overset{O}{C\!H\!\!-\!\!\diagdown\!\!}CH_2$$

(b) from about 90% to 70% of a liquid epoxy-containing condensate prepared by reacting a dimerized octadecadienoic acid with a least 1.5 times the chemical equivalent amount of a liquid glycidyl polyether of a polyhydric phenol having the general structure defind in (a) wherein the average molecular weight is from about 284 to about 500.

3. A composition according to claim 2 wherein the glycidyl polyether of a polyhydric phenol of (a) and (b) is the reaction product of epichlorohydrin and 2,2-bis(4-hydroxyphenyl)propane.

4. A composition according to claim 3 wherein said polyether of (a) has a molecular weight of about 900 and said polyether of (b) has a molecular weight of about 350 and the weight ratio of (a) to (b) is from about 15:85 to 25:75.

5. A composition according to claim 3 wherein said polyether of (a) has a molecular weight of about 2900 and said polyether of (b) has a molecular weight of about 350 and the weight ratio of (a) to (b) is from about 15:85 to 25:75.

6. A composition according to claim 3 wherein said polyether of (a) has a molecular weight of about 3750 and said polyether of (b) has a molecular weight of about 350 and the weight ratio of (a) to (b) is from about 1:9 to 25:75.

7. A process for forming a paint composition which comprises heating and blending at a temperature of about 400° F., a mixture comprising (a) from about 10% to 30% by weight of a solid glycidyl polyether of a polyhydric phenol having the general structure:

wherein A is an anlkylene radical, R is a divalent hydrocarbon radical of a dihydric phenol, n is an integer from 2 to 12 and m is an integer selected from 0 and 1, and (b) from about 70% to 90% of a liquid epoxy-containing condensate prepared by reacting a polycarboxylic acid with at least 1.5 times the chemical equivalent amount of a liquid glycidyl polyether of a polyhydric phenol having the general structure as defined in (a) wherein n has an average value between about 2 and 3.7 to obtain a clear liquid blend, subsequently cooling said blend and adding thereto from about 15% to 58% by volume of an inert organic solvent to form a solution and thereafter dispersing from 17 to 51% by volume of pigment in said solution wherein the total of solvent, pigment and blend is 100%.

8. A process according to claim 7 wherein the volume ratio of said blend to solvent is from 7:3 to 3:7 and the volume ratio of pigment dispersed to said blend is from 4:6 to 6:4.

9. A process according to claim 7 wherein the polycarboxylic acid is dimerized octadecadienoic acid.

References Cited

UNITED STATES PATENTS

| 2,970,983 | 2/1961 | Newey | 260—18 X |
| 3,057,809 | 10/1962 | Newey | 260—18 |
| 3,100,756 | 8/1963 | Wayne | 260—830 X |
| 3,219,602 | 11/1965 | Scheibli | 260—18 |
| 3,280,056 | 10/1966 | Masters | 260—18 X |

OTHER REFERENCES

Highway Research Board, Proceedings, 1960, vol. 39, Klarquist et al., pages 336–339.

DONALD E. CZAJA, *Primary Examiner.*

C. W. IVY, *Assistant Examiner.*